US012113753B2

(12) United States Patent
Hyakudai et al.

(10) Patent No.: US 12,113,753 B2
(45) Date of Patent: Oct. 8, 2024

(54) COMMUNICATION APPARATUS, COMMUNICATION SYSTEM, AND COMMUNICATION METHOD

(71) Applicant: Sony Semiconductor Solutions Corporation, Kanagawa (JP)

(72) Inventors: Toshihisa Hyakudai, San Diego, CA (US); Satoshi Ota, Kanagawa (JP); Junya Yamada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/546,982

(22) PCT Filed: Feb. 18, 2022

(86) PCT No.: PCT/JP2022/006610
§ 371 (c)(1),
(2) Date: Aug. 18, 2023

(87) PCT Pub. No.: WO2022/181476
PCT Pub. Date: Sep. 1, 2022

(65) Prior Publication Data
US 2024/0146494 A1 May 2, 2024

Related U.S. Application Data

(63) Continuation of application No. 17/536,772, filed on Nov. 29, 2021, now Pat. No. 11,863,500.
(Continued)

(51) Int. Cl.
*H04L 5/14* (2006.01)
*H04L 5/00* (2006.01)

(52) U.S. Cl.
CPC ............. *H04L 5/14* (2013.01); *H04L 5/0064* (2013.01)

(58) Field of Classification Search
CPC ................................ H04L 5/14; H04L 5/0064
See application file for complete search history.

(56) References Cited

U.S. PATENT DOCUMENTS

| 6,603,771 | B1 * | 8/2003 | Raza ................... H04L 47/6205 370/412 |
| 7,796,511 | B2 * | 9/2010 | Wood ..................... H04L 45/04 370/230 |

(Continued)

FOREIGN PATENT DOCUMENTS

| JP | H06245250 A | 9/1994 |
| JP | H09116520 A | 5/1997 |

(Continued)

OTHER PUBLICATIONS

International Search Report (PCT/ISA/210), International Application No. PCT/JP2022/006610, dated Apr. 26, 2022.

*Primary Examiner* — Bailor C Hsu
(74) *Attorney, Agent, or Firm* — Michael Best & Friedrich LLP

(57) ABSTRACT

[Object]
Transmission efficiency is improved while transmission latency is minimized as possible.
[Solving Means]
A communication apparatus includes a communication section configured to count an interval allocated in a TDD (Time Division Duplex) mode as one TDD time slot, with a plurality of the TDD time slots counted as one period, the communication section further transmitting periodically, to a communication partner apparatus, multiple application packets corresponding to multiple serial signals generated by multiple applications, and a transmission control section configured to provide, from among the multiple TDD time slots, at least one specific TDD time slot for transmitting a limited portion of the application packets corresponding to (Continued)

at least two of the multiple applications, the transmission control section further shifting, in each period, priorities of the limited portion of the application packets to be transmitted in the specific TDD time slot.

21 Claims, 10 Drawing Sheets

Related U.S. Application Data

(60) Provisional application No. 63/153,536, filed on Feb. 25, 2021.

(56) References Cited

U.S. PATENT DOCUMENTS

| | | | | |
|---|---|---|---|---|
| 7,945,884 | B1* | 5/2011 | Goergen | G06F 13/409 |
| | | | | 716/126 |
| 9,065,644 | B2* | 6/2015 | Takatori | H04B 1/0483 |
| 9,678,891 | B2* | 6/2017 | Bouley | G06F 12/1081 |
| 10,033,838 | B2* | 7/2018 | Parkin | H03M 9/00 |
| 2007/0237150 | A1 | 10/2007 | Wood | |
| 2008/0109579 | A1 | 5/2008 | Liu | |
| 2013/0315054 | A1* | 11/2013 | Shamis | H04L 47/12 |
| | | | | 370/225 |
| 2014/0181319 | A1 | 6/2014 | Chen | |
| 2019/0057048 | A1 | 2/2019 | Chang | |
| 2021/0297386 | A1* | 9/2021 | Hirama | G06F 13/4045 |
| 2022/0094513 | A1* | 3/2022 | Yamada | H04L 43/022 |

FOREIGN PATENT DOCUMENTS

| | | |
|---|---|---|
| JP | 2000209177 A | 7/2000 |
| JP | 2011-239011 A | 11/2011 |
| JP | 2015519799 A | 7/2015 |
| JP | 2019004216 A | 1/2019 |

* cited by examiner

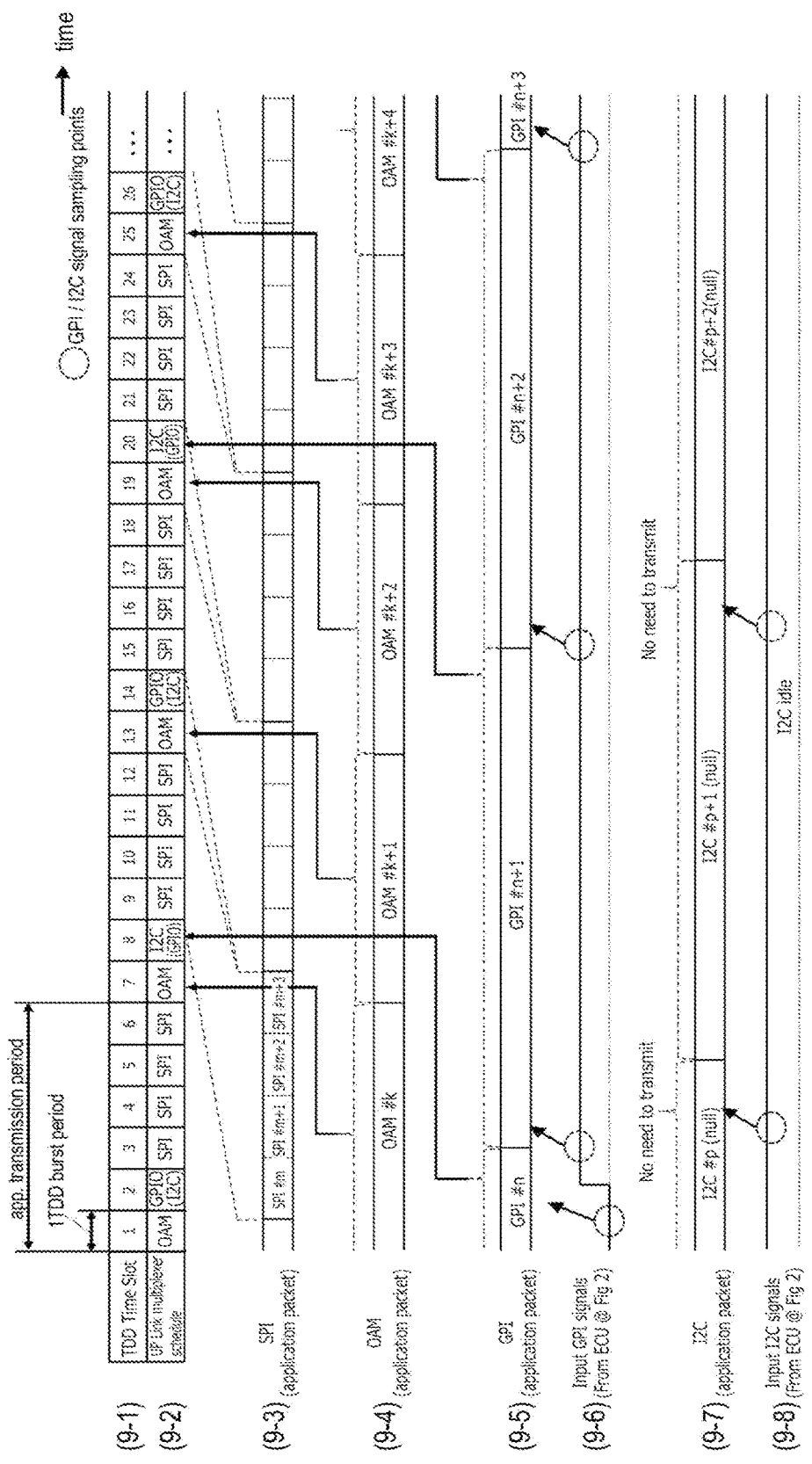

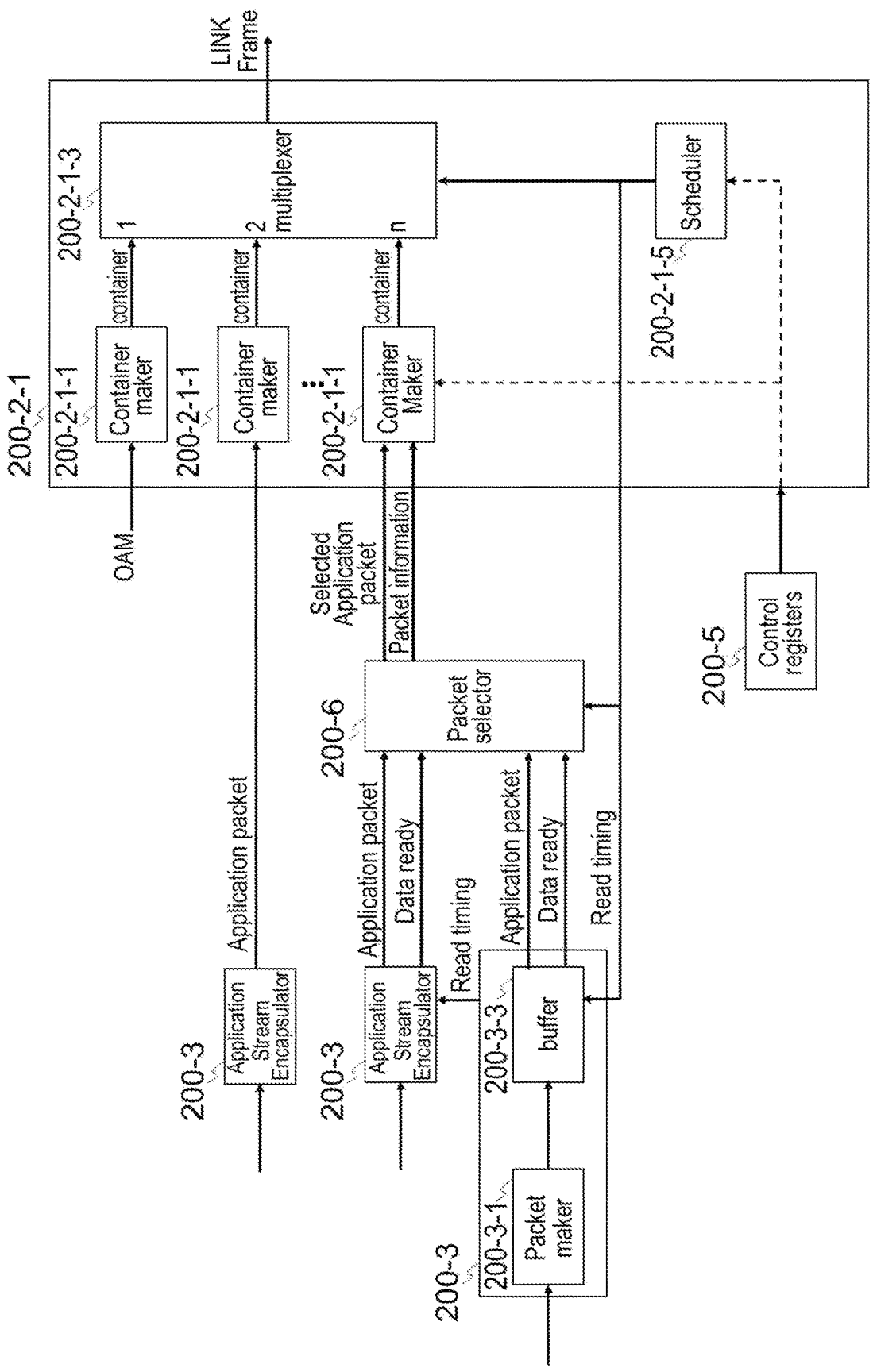
F I G . 1 0

COMMUNICATION APPARATUS, COMMUNICATION SYSTEM, AND COMMUNICATION METHOD

TECHNICAL FIELD

The present disclosure relates to a communication apparatus, a communication system, and a communication method.

BACKGROUND ART

Techniques have been proposed which permit high-speed serial communication between a Master SerDes and a Slave SerDes (see PTL 1).

In a case where serial communication is performed between two SerDeses and where there is a significant difference between the amount of data transmitted from one SerDes to the other SerDes and the amount of data transmitted in the opposite direction, a TDD (Time Division Duplex) system may presumably be adopted in order to accommodate differences in transmission capacity between uplink and downlink directions. The TDD system is a half-duplex communication system that permits communication in one direction at a time and does not allow uplink and downlink communications to proceed simultaneously.

CITATION LIST

Patent Literature

[PTL 1]
Japanese Patent Laid-open No. 2011-239011

SUMMARY

Technical Problems

There is not only one serial communication standard, and there are various serial communication standards including the SPI (Serial Peripheral Interface), GPIO (General Purpose Input/Output), and I2C (Inter-Integrated Circuit) standards. In a case where multiple types of serial signals complying with different standards are to be transmitted and received between two SerDeses, these serial signals of the different standards need to be converted into packets conforming to the standard of the TDD system.

Under the TDD system, there are cases in which packets including serial signals are transmitted and received in units of TDD time slots. In a case where multiple types of serial signals complying with different standards are to be transmitted and received in the TDD system, multiple packets each including the multiple types of serial signals may presumably be generated, each packet being allocated to a different TDD time slot when transmitted.

However, since each of the multiple types of serial signals complying with different standards has a different transmission frequency and a different signal amount, there occurs a problem of increased transmission latency if the TDD time slots are not optimally allocated. In particular, when the TDD time slots are allocated at constant intervals to the packets including serial signals having low transmission frequencies, there may not be packets to be transmitted in the allocated TDD time slots. Also, when the TDD time slots are allocated to the packets including serial signals having low transmission frequencies, there may occur increased transmission latency due to a delayed timing for transmitting the packets including serial signals having high transmission frequencies.

It is therefore an object of the present disclosure to provide a communication apparatus, a communication system, and a communication method for improving transmission efficiency while minimizing transmission latency as possible.

Solution to Problems

In solving the above problem and according to the present disclosure, there is provided a communication apparatus including a communication section configured to count an interval allocated in a TDD (Time Division Duplex) mode as one TDD time slot, with a plurality of the TDD time slots counted as one period, the communication section further transmitting periodically, to a communication partner apparatus, multiple application packets corresponding to multiple serial signals generated by multiple applications, and a transmission control section configured to provide, from among the multiple TDD time slots, at least one specific TDD time slot for transmitting a limited portion of the application packets corresponding to at least two of the multiple applications, the transmission control section further shifting, in each period, priorities of the limited portion of the application packets to be transmitted in the specific TDD time slot.

The transmission control section may shift, in each period, the priorities of the limited portion of the application packets either in a predetermined order or in a user-designated order.

The transmission control section may, in each period, shift, in rotation, the priorities of the limited portion of the application packets to be transmitted in the specific TDD time slot.

The transmission control section may transmit a packet corresponding to an application with a higher priority preferentially in the specific TDD time slot.

The transmission control section may verify whether or not an application with a higher priority has a packet ready to be transmitted in the specific TDD time slot and, in a case where the packet is not ready, verify whether or not an application with the next-highest priority has a packet ready to be transmitted in the specific TDD time slot.

The transmission control section may repeat a process of verifying whether or not there is a packet ready to be transmitted in the specific TDD time slot in descending order of priority until such a packet ready to be transmitted is found.

In a case where none of the limited portion of the applications has a packet ready to be transmitted in the specific TDD time slot, the transmission control section may stop transmitting an effective packet in the specific TDD time slot.

The transmission control section may provide, within each period, a dedicated TDD time slot for transmitting a packet including the serial signal generated by a previously designated application, apart from the specific TDD time slot.

The previously designated application may be any of the multiple applications excluding the limited portion thereof.

The transmission control section may make the number of the dedicated TDD time slots to be included in the multiple periods larger than the number of the specific TDD time slots.

The limited portion of the applications may include at least either an application for generating an I2C (Inter-Integrated Circuit) communication packet or an application for generating a GPIO (General Purpose Input/Output) communication packet, and the previously designated application may include at least either an application for generating an SPI (Serial Peripheral Interface) communication packet or an application for generating an OAM (Operation, Administration, Maintenance) packet.

The transmission control section may shift the priorities of the limited portion of the applications one position in each period and, when either the lowest or the highest priority is obtained, shift the priority to the highest or to the lowest in the next period.

On the basis of at least either transmission frequency or a signal amount of the serial signal generated by each of the multiple applications, the transmission control section may determine to allocate the dedicated time slot to the corresponding application or to share the specific TDD time slot with another application.

The above communication apparatus may further include multiple encapsulators provided corresponding to the multiple applications, each of the encapsulators being configured to generate a packet including the serial signal generated by the corresponding application and to output a ready signal indicating whether or not the packet is generated, and a frame constructor configured such that, on the basis of a plurality of the packets generated by the multiple encapsulators, the frame constructor may generate a link frame to be transmitted to the communication partner apparatus within each period, in which the frame constructor may include a scheduler configured to control the priority of the specific TDD time slot and transmit a packet in the specific TDD time slot, on the basis of at least two of the ready signals generated by at least two of the encapsulators corresponding to the limited portion of the applications.

The frame constructor may include multiple container makers each configured to generate a container including a container payload and a container header, the container payload including the packet generated by each of the multiple encapsulators, and a multiplexer configured such that under control of the scheduler, the multiplexer may generate the link frame by selecting, one by one, a plurality of the containers generated by the multiple container makers.

The number of the multiple container makers may be equal to the number of the TDD time slots in each period.

The communication apparatus may further include multiple encapsulators each provided corresponding to the multiple applications and configured to generate a packet including the serial signal generated by the corresponding application, the encapsulators further outputting a ready signal indicating whether or not the packet is generated, a packet selector configured to control the priority of the specific TDD time slot and to select the packet to be transmitted in the specific TDD time slot from among at least two of the packets generated by at least two of the encapsulators, on the basis of at least two of the ready signals generated by at least two of the encapsulators corresponding to the limited portion of the applications, and a frame constructor configured to generate a link frame to be transmitted to the communication partner apparatus in each period, on the basis of the packet selected by the packet selector and the packet corresponding to any of the multiple applications excluding the limited portion thereof, in which the frame constructor may include a scheduler configured to control the packets to be transmitted in the multiple TDD time slots in each period.

The frame constructor may include multiple container makers each configured to generate a container including a container payload and a container header, the container payload including the packet selected by the packet selector and the packet corresponding to any of the multiple applications excluding the limited portion thereof, the container header corresponding to the container payload, and a multiplexer configured such that, under control of the scheduler, the multiplexer may generate the link frame by selecting, one by one, a plurality of the containers generated by the multiple container makers.

The number of the container makers may be smaller than the number of the TDD time slots in each period.

According to the present disclosure, there is also provided a communication system including a first communication apparatus and a second communication apparatus each transmitting and receiving a packet in a TDD (Time Division Duplex) mode under a predetermined communication protocol, in which the first communication apparatus includes a communication section configured to count an interval allocated in the TDD (Time Division Duplex) mode as one TDD time slot, with a plurality of the TDD time slots counted as one period, the communication section further transmitting periodically, to a communication partner apparatus, multiple application packets corresponding to serial signals generated by multiple applications, and a transmission control section configured to provide, from among the multiple TDD time slots, at least one specific TDD time slot for transmitting a limited portion of the application packets corresponding to at least two of the multiple applications, the transmission control section further shifting, in each period, priorities of the limited portion of the application packets to be transmitted in the specific TDD time slot, and the second communication apparatus includes a second communication section configured to receive the packets transmitted from the first communication apparatus and, in each period including the multiple TDD time slots, transmit periodically the packets to the first communication apparatus.

According to the present disclosure, there is also provided a communication method including counting an interval allocated in a TDD (Time Division Duplex) mode as one TDD time slot, with a plurality of the TDD time slots counted as one period, while transmitting periodically, to a communication partner apparatus, multiple application packets corresponding to serial signals generated by multiple applications, and providing, from among the multiple TDD time slots, at least one specific TDD time slot for transmitting a limited portion of the application packets corresponding to at least two of the multiple applications, while shifting, in each period, priorities of the limited portion of the application packets to be transmitted in the specific TDD time slot.

BRIEF DESCRIPTION OF DRAWINGS

FIG. 9 is a chart depicting the transmission timing of an UP Link in the present embodiment.

FIG. 10 is a block diagram depicting a frame constructor and constituent elements peripheral thereto in a second embodiment.

DESCRIPTION OF EMBODIMENTS

Embodiments of the communication apparatus, communication system, and communication method are described below with reference to the accompanying drawings. In the description that follows, the emphasis is on the key constituent elements of the communication apparatus and communication system. However, the communication apparatus and communication method may include other constituent elements or functions not illustrated or explained. It is hence to be noted that the ensuing description does not exclude these constituent elements or functions not illustrated or explained.

Figure 1:
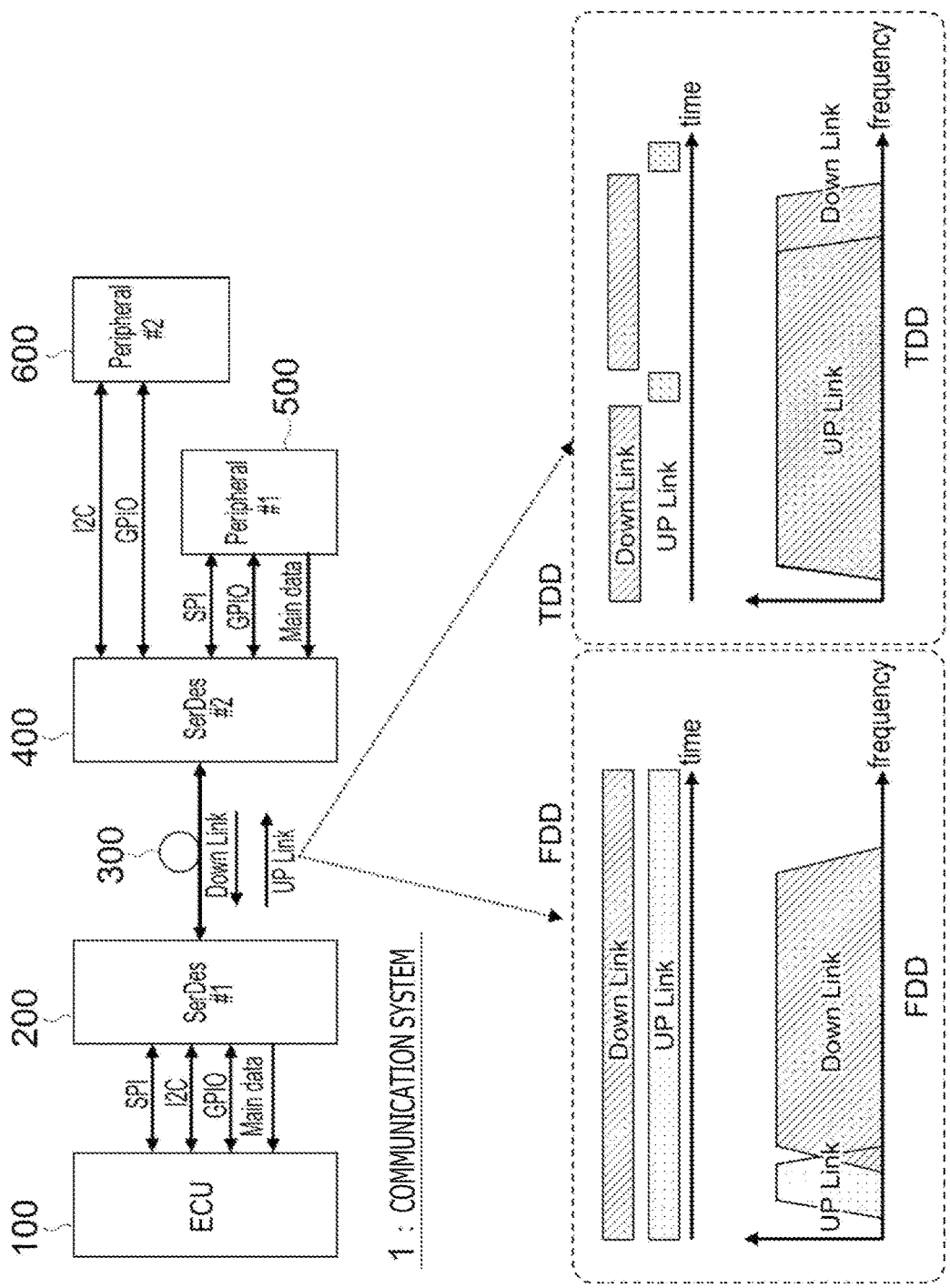
FIG. 1 is a block diagram depicting an overall configuration of a communication system.

The communication system according to the present disclosure performs serial communication between two SerDeses. FIG. 1 is a block diagram depicting an overall configuration of a communication system 1 having a SerDes 200 (SerDes #1) and a SerDes 400 (SerDes #2). FIG. 1 indicates an example in which the SerDes 200 and the SerDes 400 carry out serial communication therebetween. The SerDes 200 and the SerDes 400, which are high-speed serial interface devices, are interconnected by a cable 300 of several to a dozen meters. An ECU 100 is connected to the SerDes 200. A peripheral device 500 (Peripheral #1) and a peripheral device 600 (Peripheral #2) are connected to the SerDes 400. The ECU 100 receives main data such as video signals and transmits the received data, for example. The ECU 100 also controls the system as a whole by transmitting and receiving signals such as an SPI (Serial Peripheral Interface) signal, an I2C (Inter-Integrated Circuit) signal, and a GPIO (general-purpose IO) signal.

On the other hand, the peripheral device 500 connected to the SerDes 400 transmits the main data such as video signals at high speed and in large quantity, and transmits and receives control signals using SPI and GPIO. Also, the peripheral device 600 connected to the SerDes 400 transmits and receives low-speed signals such as observation data and control signals using I2C and GPIO.

The communication system including the two SerDeses 200 and the SerDes 400 in FIG. 1 is installed in diverse equipment such as onboard camera modules. FPD-LINK, a known serial communication interface technology, is adopted by the two SerDeses 200 and 400 for serial communication therebetween. In addition to this, at present, the Automotive SerDes Alliance (ASA), a high-speed serial interface standardization body, is working on the standardization of onboard high-speed serial interface technologies. The difference between the FPD-LINK and the ASA is that, in implementing bidirectional communication, FPD-LINK uses the Frequency Division Duplex (FDD) system while the ASA adopts the Time Division Duplex (TDD) system.

The bottom left part in FIG. 1 depicts the packet transmission timing and frequency bands for FDD, and the bottom right part illustrates the packet transmission timing and frequency bands for ASA. In an FDD mode, the Down Link and UP Link use different frequency bands for parallelly transmitting and receiving packets in overlapping periods. In the TDD mode, on the other hand, the Down Link and UP Link use overlapping frequency bands for transmitting and receiving packets on a time-division basis.

Figure 2:
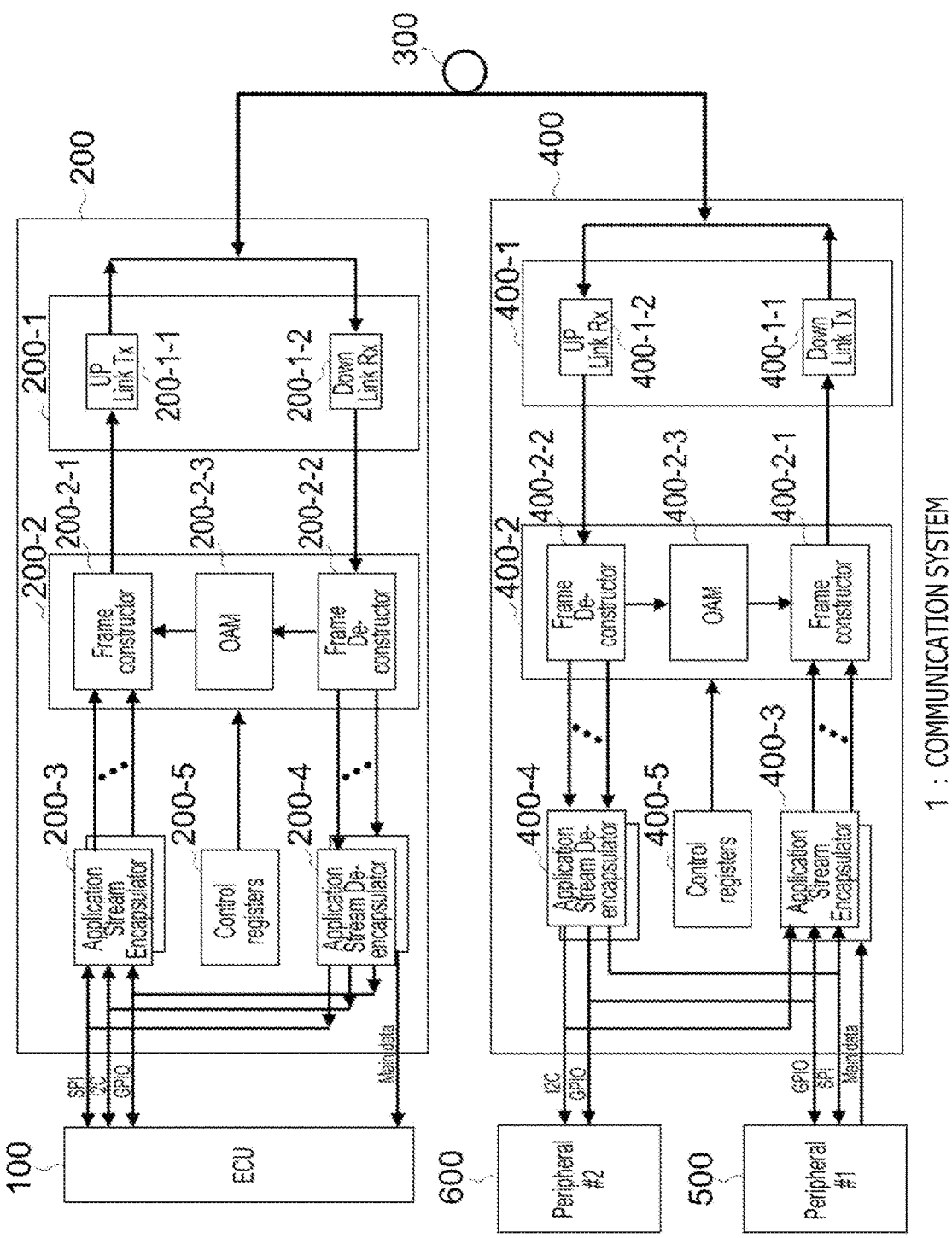
FIG. 2 is a block diagram describing a communication system materializing internal configurations of SerDes.

FIG. 2 is a block diagram describing the communication system 1 materializing the internal configurations of the SerDes 200 and 400. FIG. 2 indicates an example in which an application includes SPI, I2C, and GPIO signals. As depicted in FIG. 2, the SerDes 200 includes a PHY block 200-1, a LINK block 200-2, multiple encapsulators (Application Stream Encapsulators) 200-3, multiple de-encapsulators (Application Stream De-encapsulators) 200-4, and control registers 200-5. The PHY block 200-1 includes an UP Link transmitter 200-1-1 and a Down Link transmitter (Rx) 200-1-2. The LINK block 200-2 includes a Frame Constructor 200-2-1, a Frame De-constructor 200-2-2, and an OAM (Operation Administration Maintenance) block 200-2-3.

The ECU 100 generates the SPI, I2C, and GPIO signals as control signals according to need for processing, and outputs these serial signals to the SerDes 200. The multiple encapsulators 200-3 in the SerDes 200 are each provided for each application (e.g., for each of SPI, I2C, and GPIO signals). Each encapsulator 200-3 generates corresponding application packets.

The encapsulator 200-3 for the SPI signal receives it from the ECU 100 to generate an application packet including the SPI signal. The encapsulator 200-3 for the I2C signal receives it from the ECU 100 to generate an application packet including the I2C signal. The encapsulator 200-3 for the GPIO signal receives it from the ECU 100 to generate an application packet including the GPIO signal.

The multiple de-encapsulators 200-4 in the SerDes 200 are each provided for each application. The de-encapsulator 200-4 for the main data de-encapsulates it from the received application packet and transmits the main data to the ECU 100. The de-encapsulator 200-4 for the SPI signal de-encapsulates it from the received application packet and transmits the SPI signal to the ECU 100. The de-encapsulator 200-4 for the I2C signal de-encapsulates it from the received application packet and transmits the I2C signal to the ECU 100. The de-encapsulator 200-4 for the GPIO signal de-encapsulates it from the received application packet and transmits the GPIO signal to the ECU 100.

Figure 3:
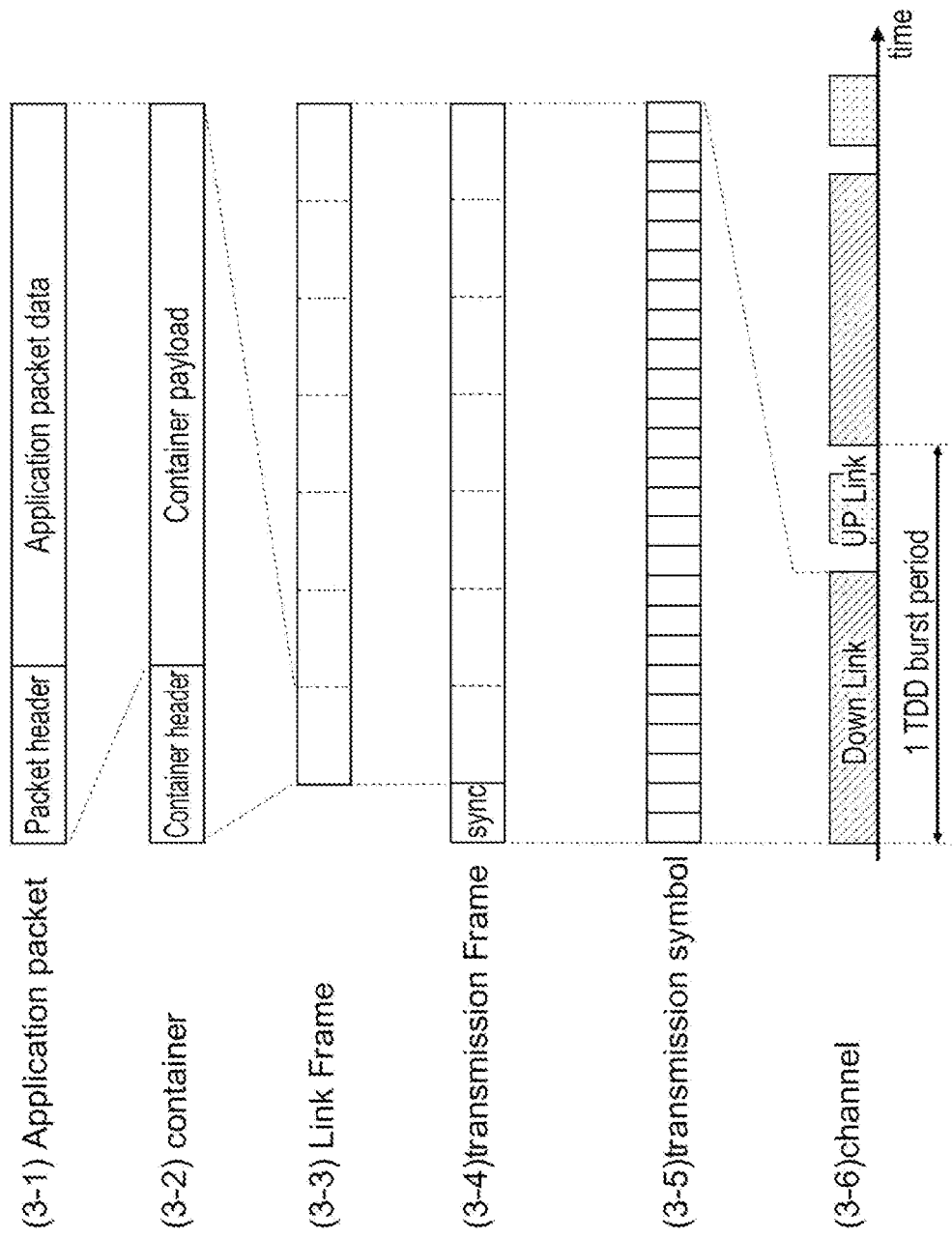
FIG. 3 is a diagram depicting the configurations of a link frame and of a transmission symbol transmitted by a PHY block.

FIG. 3 is a diagram depicting the configurations of an application packet generated by the multiple encapsulators 200-3, of a link frame generated by the LINK block 200-2, and of a transmission symbol transmitted by the PHY block 200-1. As depicted in (3-1) in FIG. 3, an application packet includes a packet header and application packet data.

The LINK block 200-2 generates a container for each of the multiple encapsulators 200-3 as well as a link frame including multiple containers. As depicted in (3-2) in FIG. 3, the container includes a container header and a container payload. The container header includes destination (address) information regarding a receiving-side device supplied from the control registers 200-5 and address information regarding the de-encapsulator 200-4.

The link frame generated by the LINK block 200-2 is supplied to the UP Link transmitter 200-1-1 in the PHY block 200-1. The UP Link transmitter 200-1-1 attaches, to the link frame ((3-3) in FIG. 3), a sync header necessary for synchronization processes on the receiving side, to generate a transmission frame ((3-4) in FIG. 3). Thereafter, by carrying out modulation processes for binary transmission (NRZ), four-level transmission (PAM4), or the like, the UP Link transmitter 200-1-1 converts the transmission frame to a transmission symbol ((3-5) in FIG. 3) for output onto the cable 300. The processes up to here constitute the transmission processing on the UP Link side.

One transmission frame ((3-4) in FIG. 3) is transmitted in the period of one TDD time slot of the TDD system. In the TDD system, Down Link transmission and UP Link transmission are performed once each at different timings in a single TDD burst period. The above-mentioned transmission frame is transmitted in a Down Link transmission period, for example. For example, in a case where the UP Link transmits only control signals and the Down Link transmits video signals including the control signals, the time periods occupied by the Down Link are basically predominant, and the time ratio of UP Link to Down Link is 1 to several dozens.

Figure 4:
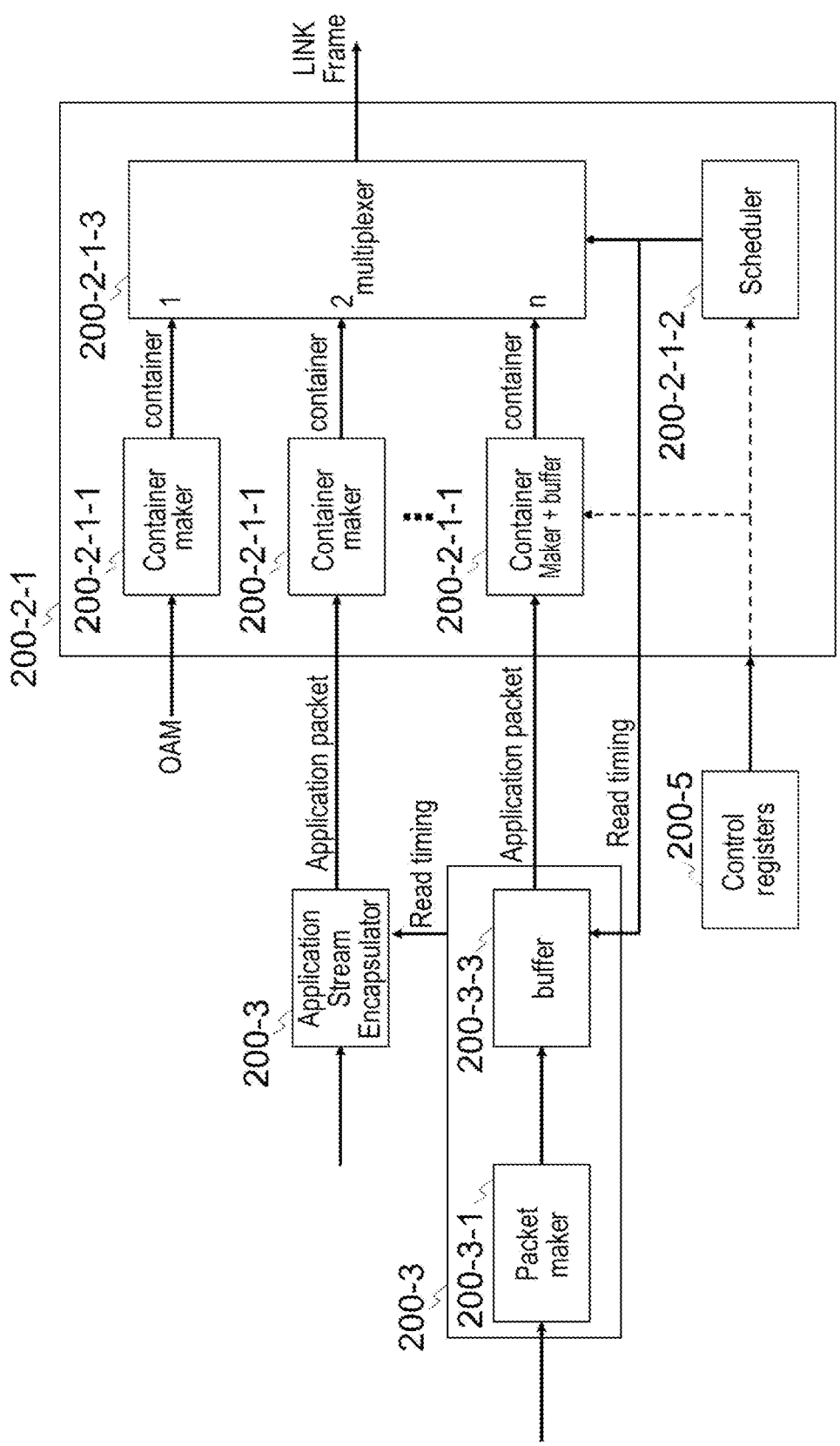
FIG. 4 is a block diagram depicting an internal configuration of a frame constructor in the SerDes of FIG. 2.

FIG. 4 is a block diagram depicting an internal configuration of the frame constructor 200-2-1 in the 200 SerDes of FIG. 2. The frame constructor 200-2-1 includes multiple container makers 200-2-1-1 corresponding to the multiple encapsulators 200-3, a multiplexer 200-2-1-3, and a scheduler 200-2-1-2. Each of the encapsulators 200-3 includes a packet maker 200-3-1 and a buffer 200-3-3. An application packet generated by each packet maker 200-3-1 is placed temporarily into the buffer 200-3-3 before being input to the corresponding container maker 200-2-1-1 in the frame constructor 200-2-1 under instructions from the scheduler 200-2-1-2.

Each container maker 200-2-1-1 receives the corresponding application packet from the corresponding encapsulator 200-3 or OAM block 200-2-3 and generates the corresponding container. The container generated by each container maker 200-2-1-1 is input to the multiplexer 200-2-1-3. The scheduler 200-2-1-2 outputs a timing adjustment signal designating the timing for outputting each container. The multiplexer 200-2-1-3 generates a link frame including multiple containers, on the basis of the timing adjustment signal from the scheduler 200-2-1-2.

At the time of system startup, the schedule corresponding to the transmission band required by the application transmitted from the ECU 100 is transferred to the control registers 200-5 by suitable means, not indicated in FIG. 2. The control registers 200-5 supply the schedule to the scheduler 200-2-1-2. This provides control such that the containers for transmitting broadband information such as the video signal are selected more frequently per unit time by the multiplexer 200-2-1-3 while low-speed signals such as the GPIO signal are selected less frequently.

Likewise, an OAM signal including the schedule generated by the ECU 100 is supplied via UP Link also to the scheduler inside a frame constructor 400-2-1 in the SerDes 400.

Explained next is the reception process on the UP Link side of the SerDes 400. As depicted in FIG. 2, the SerDes 400 includes a PHY block 400-1, a LINK block 400-2, multiple encapsulators (Application Stream Encapsulators) 400-3, multiple de-encapsulators (Application Stream De-encapsulators) 400-4, and control registers 400-5. The PHY block 400-1 includes a Down Link transmitter (Tx) 400-1-1 and an UP Link receiver (Rx) 400-1-2. The LINK block 400-2 includes a frame constructor 400-2-1, a frame de-constructor 400-2-2, and an OAM block 400-2-3.

The encapsulator 400-3 for the main data receives it from the peripheral device 500 to generate an application packet including the main data. The encapsulator 400-3 for the SPI signal receives it from the peripheral device 500 to generate an application packet including the SPI signal. The encapsulator 400-3 for the GPIO signal receives it from the peripheral device 500 to generate an application packet including the GPIO signal. The de-encapsulator 400-4 for the I2C signal de-encapsulates it from the received packet and transmits the I2C signal to the peripheral device 600. The de-encapsulator 400-4 for the GPIO signal de-encapsulates it from the received packet and transmits the GPIO signal to the peripheral device 600.

The SerDes 400 generates a clock synchronized with a symbol frequency using a sync signal attached to the head of the transmission symbol ((3-5) in FIG. 3) received from the SerDes 200, thereby reproducing a transmission frame ((3-4) in FIG. 3). A link frame ((3-3) in FIG. 3) is generated by detaching the sync header from the reproduced transmission frame ((3-4) in FIG. 3). The link frame thus generated is input to the frame de-constructor 400-2-2 in the LINK block 400-2.

The frame de-constructor 400-2-2 divides the link frame ((3-3) in FIG. 3) into containers ((3-2) in FIG. 3), acquires address information regarding the de-encapsulator 400-4 from the container header of each container, and outputs, to the corresponding de-encapsulator 400-4, the application packet ((3-1) in FIG. 3) included in the container payload of the container.

On the basis of the packet header in the corresponding application packet, each de-encapsulator 400-4 reconstructs the application packet data in the application packet in the format of each application, before outputting the reconstructed application packet data to the corresponding peripheral device 500 or 600.

The processes performed by the Down Link side transmitting information from the peripheral devices 500 and 600 to the ECU 100 are similar to those carried out by the UP Link side and thus will not be discussed further.

According to the ASA standard, which complies with the TDD system, the number of times a container ((3-2) in FIG. 3) holding each application to be transmitted is transmitted per unit time and the order in which the containers are transmitted are set beforehand at the time of system design. The settings keep the latency for each application substantially constant and suppress the problem of transmission jitter with the application. This is very convenient in a case of continuously transmitting large amounts of data such as the video signal. On the other hand, the transmission band required by each of the SPI, I2C, and GPIO signals for primarily controlling peripheral devices may be narrower than that for the video signal.

Figure 5:
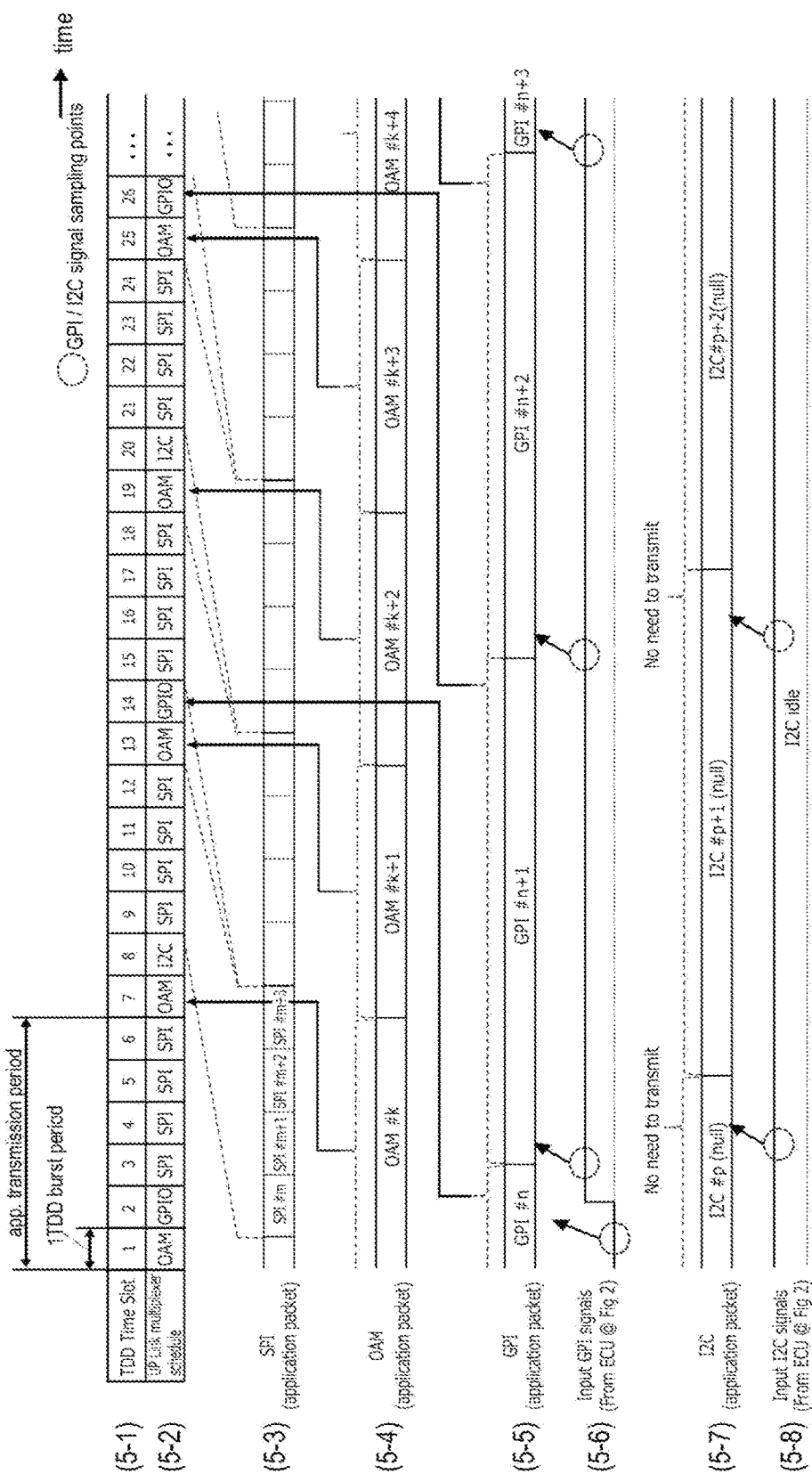
FIG. 5 is a chart depicting the transmission timing of the SerDes in FIG. 2.

FIG. 5 is a chart depicting the transmission timing of the SerDes 200 in FIG. 2. FIG. 5 indicates an example in which six TDD time slots make up one period, with the frame constructor 200-2-1 on the UP Link side setting a transmission schedule for each application packet. As indicated in FIG. 5, the switching time for switching between Down Link and UP Link once constitutes the transmission time unit in the TDD mode (1 TDD burst period=1 TDD time slot). In the example in FIG. 5, one application packet is transmitted via UP Link in one TDD time slot ((5-1) in FIG. 5). In this case, the application packet including the QAM signal is transmitted once every six TDD time slots, the application packet including the SPI signal is transmitted four times every six TDD time slots, and the application packet including the GPIO or I2C is transmitted once every 12 TDD time slots ((5-2) in FIG. 5).

As indicated in FIGS. 2 through 4, the SPI signal, the I2C signal, or the GPIO signal input to the SerDes 200 is input temporarily to the encapsulator 200-3 for conversion to the corresponding application packet. Following the conversion, the application packet is buffered before being input to the frame constructor 200-2-1 according to a read timing of the scheduler 200-2-1-2. The read timing determined by the scheduler 200-2-1-2 coincides with the transmission schedule for each application as illustrated in (5-1) and (5-2) in FIG. 5. For example, SPI signal application packets SPI #m and SPI #m+1 are transmitted in TDD time slots #9 and #10 ((5-3) in FIG. 5) respectively, and GPIO application packets GPI #n and GPI #n+1 ((5-5) in FIG. 5) are transmitted in each of TDD time slots #14 and #26 ((5-2) in FIG. 5).

It is to be noted that, at this point in time, the I2C signal is in an idle state ((5-8) in FIG. 5), so that the I2C signal application packet need not be transmitted ((5-8) in FIG. 5).

Figure 6:
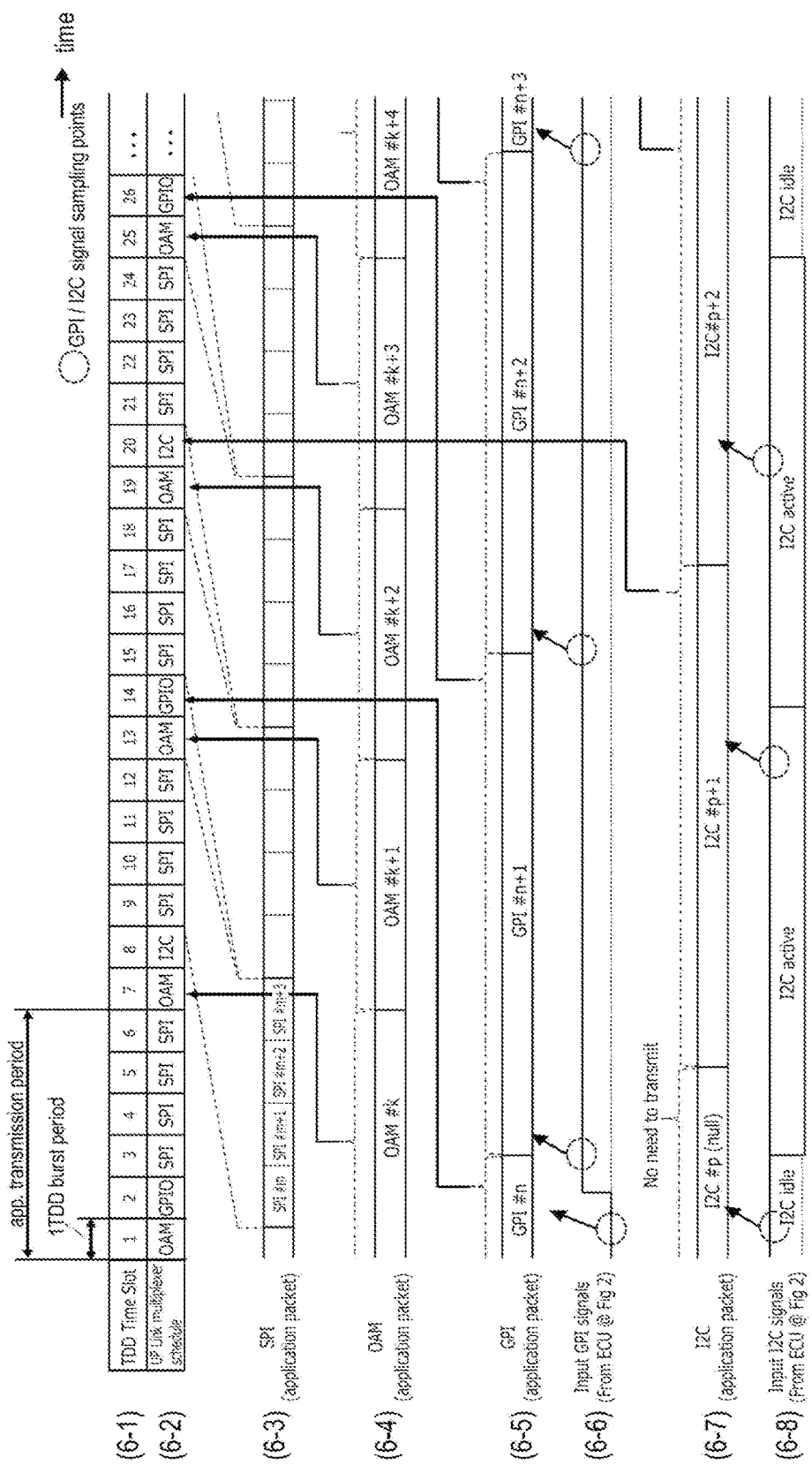
FIG. 6 is a chart depicting the transmission timing in a case where an I2C signal is input from an ECU to the SerDes.

FIG. 6 is a chart depicting the transmission timing in a case where an I2C signal is input from the ECU 100 to the SerDes 200. In the case of FIG. 6, the I2C signal application packet is transmitted in a TDD time slot #20.

Suppose now that the GPIO signal is used to transmit signals such as an interrupt signal for which the necessary transmission bands are small in number but of which the change in the signal state is unpredictable. It is assumed that, since the bands necessary for transmitting the GPIO signal are small in number, one TDD time slot is allocated every 12 TDD time slots as depicted in FIG. 5. In this case, the change in the GPI signal ((5-6) in FIG. 5) input from the ECU 100 is sampled at intervals of 12 TDD time slots for conversion to GPIO packets GPI #n and GPI #n+1 ((5-5) in FIG. 5) to be transmitted in each of TDD time slots #14 and #26 ((5-2) in FIG. 5).

Whereas a change in the state of the GPIO signal ((5-6) in FIG. 5) input from the ECU 100 occurs near TDD time slots #2 and #3, the change is timed to be packetized and transmitted in the TDD time slot #26. This is how transmission latency occurs. For example, in a case where one TDD burst period is approximately 30 psec, transmission latency of approximately 690 psec occurs.

In order to shorten the transmission latency for a given application, the frequency at which the TDD time slot is allocated to the application need only be increased. However, since the application transmits signals not continuously but only if necessary, the utilization efficiency of the TDD time slots is degraded in a case where the required transmission bands are small in number.

In view of the above, the communication apparatus and communication system according to the present disclosure are designed to improve transmission efficiency while minimizing transmission latency when multiple applications to which a transmission schedule is assigned beforehand are transmitted in a TDD transmission system.

First Embodiment

Figure 7:
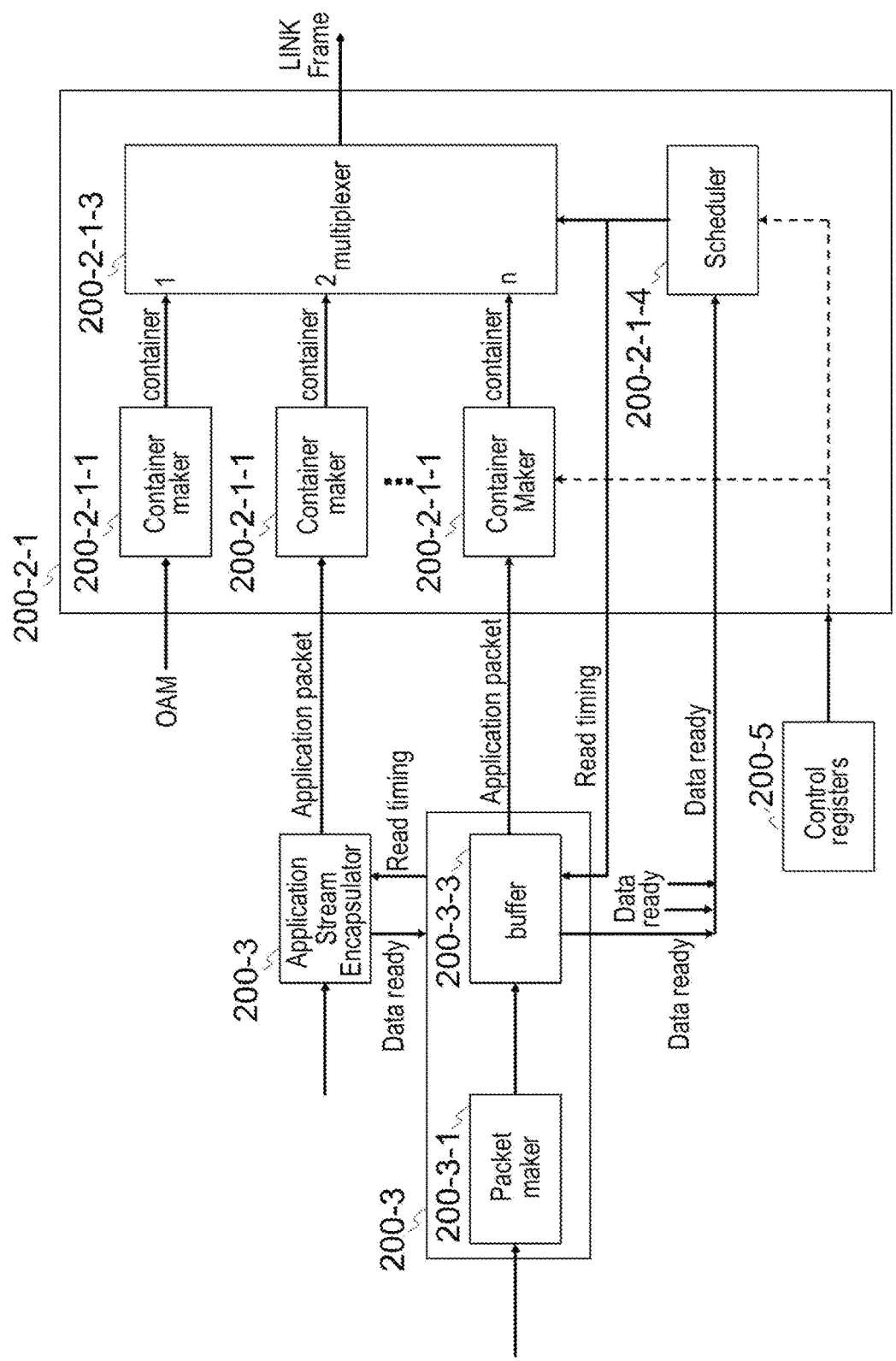
FIG. 7 is a block diagram of a frame constructor in a first embodiment of the present disclosure.

FIG. 7 is a block diagram of the frame constructor 200-2-1 in a first embodiment of the present disclosure. In FIG. 7, the constituent elements common to those of the frame constructor 200-2-1 in FIG. 4 are designated by the same reference signs. What follows primarily is a description of the differences between the two frame constructors. The frame constructor 200-2-1 in FIG. 7, as with its counterpart in FIG. 4, includes multiple container makers 200-2-1-1 corresponding to multiple encapsulators 200-3, a multiplexer 200-2-1-3, and a scheduler 200-2-1-4.

In the frame constructor 200-2-1 in FIG. 7, the scheduler 200-2-1-4 operates differently from the scheduler 200-2-1-4 in FIG. 4. Also, each encapsulator 200-3 in FIG. 7 outputs a data ready signal upon placing the application packet generated by the corresponding packet maker 200-3-1 into the corresponding buffer 200-3-3. The data ready signal is a signal indicating that an effective application packet is held in the corresponding buffer 200-3-3. The data ready signal from each encapsulator 200-3 is input to the scheduler 200-2-1-4. On the basis of the data ready signal from each encapsulator 200-3, the scheduler 200-2-1-4 controls the order in which the container generated by each container maker 200-2-1-1 is included in a transmission frame.

Figure 8:
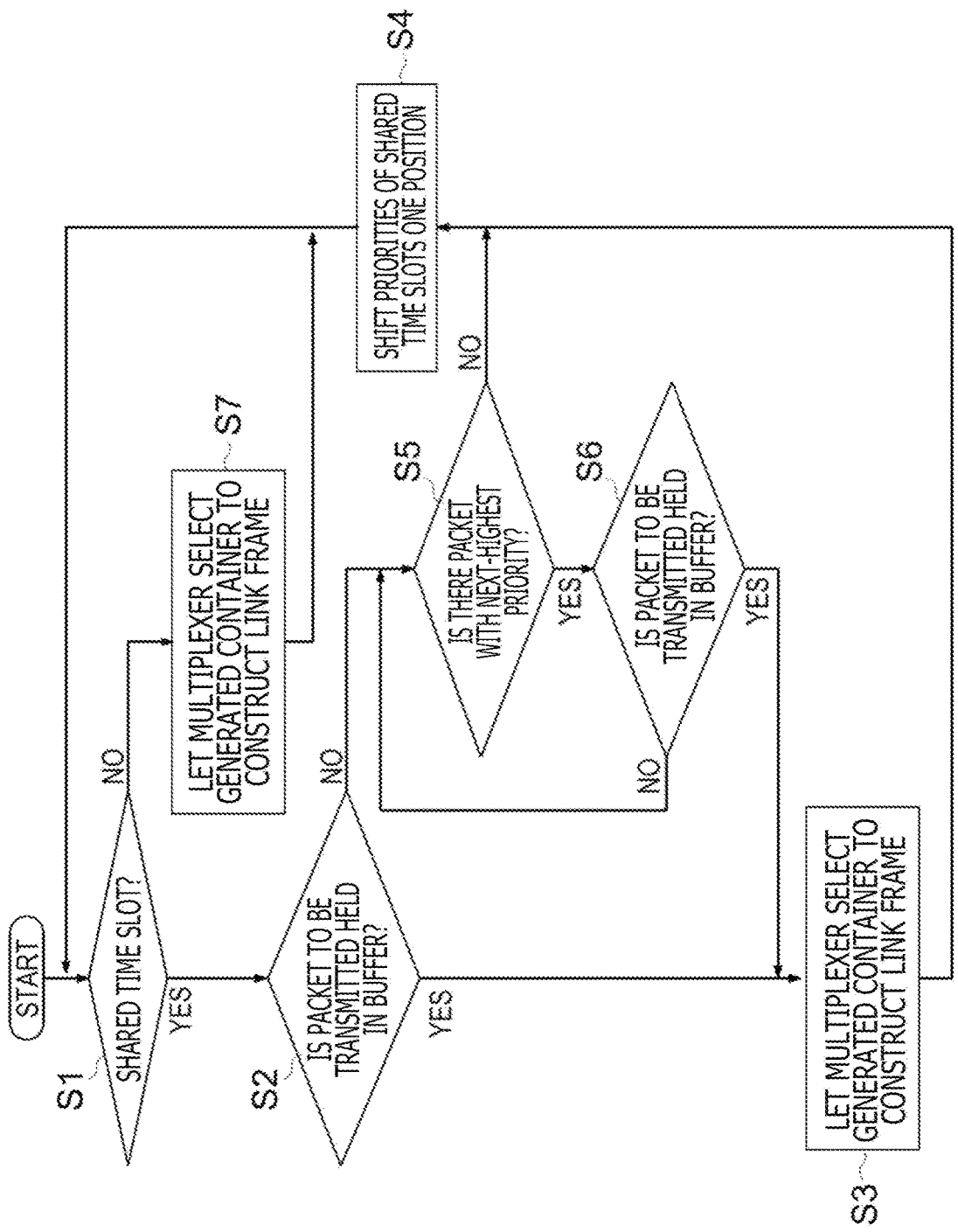
FIG. 8 is a flowchart indicating processing operations performed by the scheduler in FIG. 7.

FIG. 8 is a flowchart indicating processing operations performed by the scheduler 200-2-1-4 in FIG. 7. FIG. 9 is a chart depicting the transmission timing of the UP Link in the present embodiment. Described below with reference to FIGS. 7 through 9 are the processing operations carried out by the communication apparatus and communication system in the present embodiment.

As with the scheduler 200-2-1-2 in FIG. 4, under schedule control of the ECU 100 via the control registers 200-5, the scheduler 200-2-1-4 in FIG. 7 determines in advance which application packet is to be allocated to which TDD time slot before the communication system starts transmission.

The ECU 100 or the control registers 200-5 provide a specific TDD time slit (shared time slot) for the scheduler 200-2-1-4. Not one application packet but multiple application packets are allocated to the shared time slot. The application packets to be transmitted in the specific shared time slot are to be allocated the signals such as control signals for which the transmission bands are relatively small in number and of which the transmission frequency is low.

Also, the ECU 100 or the control registers 200-5 set, for the scheduler 200-2-1-4, the priorities with which the application packets allocated to the shared time slot are to be output. How many shared time slots are to be provided, which application packets are to be allocated to these time slots, and with what priorities the application packets are to be output are changed according to the system and the operation status. The priorities may be determined at the time of system design, for example. That is, in what order and at what intervals the priorities are to be shifted may be determined at the time of system design and stored in a memory or registers, not depicted. Alternatively, the user may set the priorities or the order in which the priorities are to be shifted by use of register values that can be updated as needed. In this case, the priorities or the order in which to shift the priorities can be changed by the user updating the register values in a suitably timed manner.

The scheduler 200-2-1-4 determines whether or not the TDD time slot to be scheduled is the shared time slot (step S1). For example, TDD time slots #2, #8, #14, #20, and #26 in FIG. 9 are each determined to be the shared time slot.

In the case of the shared time slot, whether or not an application packet with the highest priority is held in the corresponding buffer 200-3-3 is determined by use of a data ready signal (step S2). In a case where such an application packet is held in the buffer 200-3-3, the application packet is determined to be ready. Then, a container is generated by the container maker 200-2-1-1 corresponding to the application packet held in the buffer 200-3-3. The generated container is selected by the multiplexer 200-2-1-3 so as to construct a link frame (step S3).

Thereafter, the priorities of the shared time slots are shifted one position (step S4). For example, in a case where there are application packets A, B, and C, the shared time slots #2, #8, #14, #20, and #26 in FIG. 9 are shifted as indicated below, for example. It is to be noted that what is given below is only an example and that the priorities may be shifted in any desired order.

Priority of shared time slot #2: A->B->C
Priority of shared time slot #8: B->C->A
Priority of shared time slot #14: C->A->B
Priority of shared time slot #20: A->B->C
Priority of shared time slot #26: B->C->A At the end of the process in step S4 in FIG. 8, the processes of step S1 and subsequent steps are repeated. More specifically, for example, the processing is such that, in FIG. 9, the priority of the TDD time slot #2 is set to GPIO>I2C, that the priority of the next TDD time slot #8 is set to I2C>GPIO, and that the priority of the next TDD time slot #14 is back to GPIO>I2C. This makes it possible to secure the transmission bands initially allocated to the application packets. In such a manner, the priorities of the shared time slots are shifted one position per period.

If it is determined, in step S2, that the application packet is not held in the buffer 200-3-3, it is then determined whether or not there is an application packet with the next-highest priority (step S5). If it is determined that there is the application packet, it is then determined whether or not the application packet is held in the corresponding buffer 200-3-3, by use of the data ready signal (step S6). If the application packet is determined to be held in the corresponding buffer 200-3-3, the procedure proceeds to step S3. For example, for the TDD time slot #8 in FIG. 9, the highest priority belongs to an application packet that includes the I2C signal. At this point in time, however, the I2C signal is null, so that no application packet including the I2C signal is held in the corresponding buffer 200-3-3. As a result, the determination in step S2 in FIG. 8 is NO, and the procedure proceeds to step S5. In step S5, it is then determined whether or not there is an application packet with the next-highest priority. For the TDD time slot #8 in FIG. 9, the GPIO signal is one which has the highest priority next to the I2C signal. At this point in time, an application packet including the GPIO signal is held in the corresponding buffer 200-3-3 (GPI #n+1 in (9-5) in FIG. 9). Here, the container maker 200-2-1-1 corresponding to this application packet generates a container including this application packet.

On the other hand, if it is determined, in step S5, that there is no application packet with the next-highest priority, the procedure then proceeds to step S4. For example, for the TDD time slot #14 in FIG. 9, an application packet including the GPIO signal is one which has the highest priority. At this point in time, no application packet to be transmitted is held in the buffer 200-3-3 inside the encapsulator 200-3 for the GPIO signal. As a result, the determination in step S2 in FIG. 8 is NO, and the procedure proceeds to step S5. In step S5, it is determined whether or not there is an application packet with the next-highest priority. For the TDD time slot #14 in FIG. 9, the I2C signal is one which has the next-highest priority. At this point in time, however, the I2C signal is null, so that no effective application packet is held in the corresponding buffer 200-3-3. As a result, the determination in step S5 is NO, and the procedure proceeds to step S4. In step S4, the priorities of the shared time slots are shifted.

If it is determined, in step S1, that the time slot is not a shared time slot, the application packet designated by the scheduler 200-2-1-4 is selected. A container is then generated by the container maker 200-2-1-1 that corresponds to the selected application packet. The generated container is selected by the multiplexer 200-2-1-3 so as to construct a link frame (step S7). At the end of the process in step S7, the processes of step S1 and subsequent steps are repeated.

As described above, in a case where the first embodiment performs serial transmission using the TDD system, the shared time slot is provided, in one period including multiple TDD time slots, to permit transmission of a packet including one of the multiple types of serial signals. Then, multiple types of application packets including application signals with low transmission frequency are arranged to be transmitted in the shared time slots. Since the priorities of multiple types of application packets to be transmitted in the shared time slots are shifted in rotation, these multiple types of application packets can be transmitted with a constant latency. Also, because the multiple types of application packets with low transmission frequency are transmitted in the shared time slots, it is possible to increase the number of TDD time slots allocated to the application packets with high transmission frequency and to thereby further reduce the transmission latency of the application packets with high transmission frequency. The present embodiment thus makes it possible to efficiently transmit multiple types of serial signals corresponding to multiple applications by use of the TDD system.

Second Embodiment

In a second embodiment, the frame constructor 200-2-1 and constituent elements peripheral thereto in the LINK block 200-2 are different from those in the first embodiment.

FIG. 10 is a block diagram depicting the frame constructor 200-2-1 and constituent elements peripheral thereto in the second embodiment. In the second embodiment, a packet selector 200-6 is arranged between multiple encapsulators 200-3 on one hand and the frame constructor 200-2-1 on the other hand.

The packet selector 200-6 implements some of the functions of a scheduler 200-2-1-5 in FIG. 7. Specifically, the packet selector 200-6 is connected to at least two encapsulators 200-3 that transmit application packets in shared time slots. Each of the at least two encapsulators 200-3 connected to the packet selector 200-6 has a packet maker 200-3-1 and a buffer 200-3-3. Each encapsulator 200-3 outputs a data ready signal when an application packet is placed into the corresponding buffer 200-3-3. These data ready signals are input to the packet selector 200-6.

The packet selector 200-6 selects the application packets to be transmitted in shared time slots, on the basis of the data ready signals from the at least two encapsulators 200-3 for application packet transmission in the shared time slots. The data ready signal is a signal indicating that the corresponding application packet is placed into the corresponding buffer 200-3-3, the data ready signal being output from the corresponding encapsulator 200-3. The application packets selected in the shared time slots are input to the frame constructor 200-2-1.

The frame constructor 200-2-1 in FIG. 10, as with its counterpart in FIG. 7, includes multiple container makers 200-2-1-1 corresponding to multiple encapsulators 200-3 or to an OAM block 200-2-3, a multiplexer 200-2-1-3, and a scheduler 200-2-1-5. The scheduler 200-2-1-5 in FIG. 10 differs from the scheduler 200-2-1-5 in FIG. 7.

The frame constructor 200-2-1 in FIG. 7 has as many container makers 200-2-1-1 as the multiple encapsulators 200-3. The frame constructor 200-2-1 in FIG. 10, on the other hand, has fewer container makers 200-2-1-1 than the multiple encapsulators 200-3. More specifically, the packet selector 200-6 selects one of the multiple application packets to be transmitted in the shared time slots, the selected application packet being input to the dedicated container maker 200-2-1-1.

The packet selector 200-6 receives input of a read timing signal from the scheduler 200-2-1-5 giving notice of the timing of the shared time slots. Upon input of the read timing signal, the packet selector 200-6 performs processing operations similar to those in the flowchart of FIG. 8. Upon selection of the application packet to be transmitted in the shared time slot, the packet selector 200-6 transmits the selected application packet to the corresponding container maker 200-2-1-1 together with packet information indicating to which application the application packet corresponds. The corresponding container maker 200-2-1-1 generates a container header on the basis of the received packet information, and also generates a container payload including the received application packet, thereby completing a container.

On the basis of setting information in the control registers 200-5, the scheduler 200-2-1-5 in the frame constructor 200-2-1 selects multiple containers, one by one, that are generated by the multiple container makers 200-2-1-1, so as to generate a link frame.

As described above, the second embodiment has the packet selector 200-6 arranged between the multiple encapsulators 200-3 on one hand and the frame constructor 200-2-1 on the other hand so as to select the application packets to be transmitted in the shared time slots. This can reduce the number of the container makers 200-2-1-1 in the frame constructor 200-2-1. Since the packet selector 200-6 performs part of the processes of schedule control by the scheduler 200-2-1-5, the processing load on the scheduler 200-2-1-5 is alleviated, and the internal configuration of the frame constructor 200-2-1 is simplified.

Note that the present technology can have the following configurations.

(1)
A communication apparatus including:
a communication section configured to count an interval allocated in a TDD (Time Division Duplex) mode as one TDD time slot, with a plurality of the TDD time slots counted as one period, the communication section further transmitting periodically, to a communication partner apparatus, multiple application packets corresponding to multiple serial signals generated by multiple applications; and
a transmission control section configured to provide, from among the multiple TDD time slots, at least one specific TDD time slot for transmitting a limited portion of the application packets corresponding to at least two of the multiple applications, the transmission control section further shifting, in each period, priorities of the limited portion of the application packets to be transmitted in the specific TDD time slot.

(2)
The communication apparatus according to (1), in which the transmission control section shifts, in each period, the priorities of the limited portion of the application packets either in a predetermined order or in a user-designated order.

(3)
The communication apparatus according to (1), in which the transmission control section, in each period, shifts, in rotation, the priorities of the limited portion of the application packets to be transmitted in the specific TDD time slot.

(4)
The communication apparatus according to (1), in which the transmission control section transmits a packet corresponding to an application with a higher priority preferentially in the specific TDD time slot.

(5)
The communication apparatus according to any one of (1) to (4), in which the transmission control section verifies whether or not an application with a higher priority has a packet ready to be transmitted in the specific TDD time slot and, in a case where the packet is not ready, verifies whether or not an application with the next-highest priority has a packet ready to be transmitted in the specific TDD time slot.

(6)
The communication apparatus according to (5), in which the transmission control section repeats a process of verifying whether or not there is a packet ready to be transmitted in the specific TDD time slot in descending order of priority until such a packet ready to be transmitted is found.

(7)
The communication apparatus according to any one of (1) to (6), in which, in a case where none of the limited portion of the applications has a packet ready to be transmitted in the specific TDD time slot, the transmission control section stops transmitting an effective packet in the specific TDD time slot.

(8)
The communication apparatus according to any one of (1) to (7), in which the transmission control section provides, within each period, a dedicated TDD time slot for transmitting a packet including the serial signal generated by a previously designated application, apart from the specific TDD time slot.

(9)
The communication apparatus according to (8), in which the previously designated application is any of the multiple applications excluding the limited portion thereof.

(10)
The communication apparatus according to (8) or (9), in which the transmission control section makes the number of the dedicated TDD time slots to be included in the multiple periods larger than the number of the specific TDD time slots.

(11)
The communication apparatus according to any one of (8) to (10), in which
the limited portion of the applications includes at least either an application for generating an I2C (Inter-Integrated Circuit) communication packet or an application for generating a GPIO (General Purpose Input/Output) communication packet, and
the previously designated application includes at least either an application for generating an SPI (Serial Peripheral Interface) communication packet or an application for generating an OAM (Operation, Administration, Maintenance) packet.

(12)
The communication apparatus according to any one of (1) to (11), in which the transmission control section shifts the priorities of the limited portion of the applications one position in each period and, when either the lowest or the highest priority is obtained, shifts the priority to the highest or to the lowest in the next period.

(13)
The communication apparatus according to any one of (8) to (11), in which, on the basis of at least either transmission frequency or a signal amount of the serial signal generated by each of the multiple applications, the transmission control section determines to allocate the dedicated time slot to the corresponding application or to share the specific TDD time slot with another application.

(14)
The communication apparatus according to any one of (1) to (13), further including:
multiple encapsulators provided corresponding to the multiple applications, each of the encapsulators being configured to generate a packet including the serial signal generated by the corresponding application and to output a ready signal indicating whether or not the packet is generated; and
a frame constructor configured such that, on the basis of a plurality of the packets generated by the multiple encapsulators, the frame constructor generates a link frame to be transmitted to the communication partner apparatus within each period,
in which the frame constructor includes a scheduler configured to control the priority of the specific TDD time slot and transmit a packet in the specific TDD time slot, on the basis of at least two of the ready signals generated by at least two of the encapsulators corresponding to the limited portion of the applications.

(15)
The communication apparatus according to (14), in which the frame constructor includes
multiple container makers each configured to generate a container including a container payload and a container header, the container payload including the packet generated by each of the multiple encapsulators, and
a multiplexer configured such that, under control of the scheduler, the multiplexer generates the link frame by selecting, one by one, a plurality of the containers generated by the multiple container makers.

(16)
The communication apparatus according to (15), in which the number of the multiple container makers is equal to the number of the TDD time slots in each period.

(17)
The communication apparatus according to any one of (1) to (13), further including:
multiple encapsulators each provided corresponding to the multiple applications and configured to generate a packet including the serial signal generated by the corresponding application, the encapsulators further outputting a ready signal indicating whether or not the packet is generated;
a packet selector configured to control the priority of the specific TDD time slot and to select the packet to be transmitted in the specific TDD time slot from among at least two of the packets generated by at least two of the encapsulators, on the basis of at least two of the ready signals generated by at least two of the encapsulators corresponding to the limited portion of the applications; and
a frame constructor configured to generate a link frame to be transmitted to the communication partner apparatus in each period, on the basis of the packet selected by the packet selector and the packet corresponding to any of the multiple applications excluding the limited portion thereof,
in which the frame constructor includes a scheduler configured to control the packets to be transmitted in the multiple TDD time slots in each period.

(18)
The communication apparatus according to (17), in which the frame constructor includes
multiple container makers configured to each generate a container including a container payload and a container header, the container payload including the packet selected by the packet selector and the packet corresponding to any of the multiple applications excluding the limited portion thereof, the container header corresponding to the container payload, and
a multiplexer configured such that, under control of the scheduler, the multiplexer generates the link frame by selecting, one by one, a plurality of the containers generated by the multiple container makers.

(19)
The communication apparatus according to (18), in which the number of the container makers is smaller than the number of the TDD time slots in each period.

(20)
A communication system including:
a first communication apparatus and a second communication apparatus each transmitting and receiving a packet in a TDD (Time Division Duplex) mode under a predetermined communication protocol, in which
the first communication apparatus includes
a communication section configured to count an interval allocated in the TDD (Time Division Duplex) mode as one TDD time slot, with a plurality of the TDD time slots counted as one period, the communication section further transmitting periodically, to a communication partner apparatus, multiple application packets corresponding to serial signals generated by multiple applications, and
a transmission control section configured to provide, from among the multiple TDD time slots, at least one specific TDD time slot for transmitting a limited portion of the application packets corresponding to at least two of the multiple applications, the transmission control section further shifting, in each period, priorities of the limited portion of the application packets to be transmitted in the specific TDD time slot, and
the second communication apparatus includes a second communication section configured to receive the packets transmitted from the first communication apparatus and, in each period including the multiple TDD time slots, transmit periodically the packets to the first communication apparatus.

(21)
A communication method including:
counting an interval allocated in a TDD (Time Division Duplex) mode as one TDD time slot, with a plurality of the TDD time slots counted as one period, while transmitting periodically, to a communication partner apparatus, multiple application packets corresponding to serial signals generated by multiple applications; and providing, from among the multiple TDD time slots, at least one specific TDD time slot for transmitting a limited portion of the application packets corresponding to at least two of the multiple applications, while shifting, in each period, priorities of the limited portion of the application packets to be transmitted in the specific TDD time slot.

The embodiments of the present disclosure are not limited to those discussed above and include diverse variations that may be conceived by persons skilled in the art. Also, the advantageous effects of this disclosure are not limited to those stated above. That is, what is disclosed above may be variably supplemented, modified, or partially deleted within the technical idea and scope of the present disclosure as defined by the appended claims and their equivalents.

REFERENCE SIGNS LIST

1: Communication system
200: SerDes
200-1: PHY block
200-1-1: Link transmitter
200-2: LINK block
200-2-1: Frame constructor
200-2-1-1: Container maker
200-2-1-2: Scheduler
200-2-1-3: Multiplexer
200-2-1-4: Scheduler
200-2-1-5: Scheduler
200-2-2: Frame de-constructor
200-2-3: OAM block
200-3: Encapsulator
200-3-1: Packet maker
200-3-3: Buffer
200-4: De-encapsulator
200-5: Control register
200-6: Packet selector
300: Cable
400: SerDes
400-1: PHY block
400-2: LINK block
400-2-1: Frame constructor
400-2-2: Frame de-constructor
400-2-3: OAM block
400-3: Encapsulator
400-4: De-encapsulator
500: Peripheral device
600: Peripheral device

The invention claimed is:

1. A communication apparatus comprising:
a frame constructor configured to count an interval allocated in a TDD (Time Division Duplex) mode as one TDD time slot of a plurality of TDD time slots, with the plurality of TDD time slots being counted as one period;
a transmitter configured to transmit periodically, to a communication partner apparatus, multiple application packets corresponding to multiple serial signals generated by multiple applications; and
a control unit configured to provide, from among the plurality of TDD time slots, at least one specific TDD time slot for transmitting a limited portion of the application packets corresponding to at least two of the multiple applications, wherein the frame constructor is configured for shifting, in each period, priorities of the limited portion of the application packets to be transmitted in the at least one specific TDD time slot.

2. The communication apparatus according to claim 1, wherein the frame constructor shifts, in each period, the priorities of the limited portion of the application packets either in a predetermined order or in a user-designated order.

3. The communication apparatus according to claim 1, wherein the frame constructor, in each period, shifts, in rotation, the priorities of the limited portion of the application packets to be transmitted in the at least one specific TDD time slot.

4. The communication apparatus according to claim 1, wherein the transmitter transmits a packet corresponding to an application with a higher priority preferentially in the at least one specific TDD time slot.

5. The communication apparatus according to claim 1, wherein the frame constructor verifies whether or not an application with a higher priority has a packet ready to be transmitted in the at least one specific TDD time slot and, in a case where the packet is not ready, verifies whether or not an application with a next-highest priority has a packet ready to be transmitted in the at least one specific TDD time slot.

6. The communication apparatus according to claim 5, wherein
the frame constructor repeats a process of verifying whether or not there is a packet ready to be transmitted in the at least one specific TDD time slot in descending order of priority until such a packet ready to be transmitted is found.

7. The communication apparatus according to claim 1, wherein,
in a case where none of the limited portion of the applications has a packet ready to be transmitted in the at least one specific TDD time slot, the transmitter stops transmitting an effective packet in the at least one specific TDD time slot.

8. The communication apparatus according to claim 1, wherein the frame constructor provides, within each period, a dedicated TDD time slot for transmitting a packet including a corresponding serial signal generated by a previously designated application, apart from the at least one specific TDD time slot.

9. The communication apparatus according to claim 8, wherein the previously designated application is any of the multiple applications excluding the limited portion thereof.

10. The communication apparatus according to claim 8, wherein the frame constructor makes the number of the dedicated TDD time slots to be included in the multiple periods larger than the number of the specific TDD time slots.

11. The communication apparatus according to claim 8, wherein
the limited portion of the applications includes at least either an application for generating an I2C (Inter-Integrated Circuit) communication packet or an application for generating a GPIO (General Purpose Input/Output) communication packet, and
the previously designated application includes at least either an application for generating an SPI (Serial Peripheral Interface) communication packet or an application for generating an OAM (Operation, Administration, Maintenance) packet.

12. The communication apparatus according to claim 1, wherein the frame constructor shifts the priorities of the limited portion of the applications one position in each period and, when either a lowest or a highest priority is obtained, shifts the priority to the highest or to the lowest in a next period.

13. The communication apparatus according to claim 8, wherein,
on a basis of at least either transmission frequency or a signal amount of corresponding serial signals generated by each of the multiple applications, the frame constructor determines to allocate the dedicated time slot to the corresponding application or to share the at least one specific TDD time slot with another application.

14. The communication apparatus according to claim 1, further comprising:
multiple encapsulators provided corresponding to the multiple applications, each of the encapsulators being configured to generate a packet including a corresponding serial signal generated by the corresponding application and to output a ready signal indicating whether or not the packet is generated; and
wherein the frame constructor is configured such that, on a basis of a plurality of the packets generated by the multiple encapsulators, the frame constructor generates a link frame to be transmitted to the communication partner apparatus within each period, and
wherein the frame constructor includes a scheduler configured to control the priority of the at least one specific TDD time slot and transmit a packet in the at least one specific TDD time slot, on a basis of at least two of the ready signals generated by at least two of the encapsulators corresponding to the limited portion of the applications.

15. The communication apparatus according to claim 14, wherein the frame constructor includes
multiple container makers each configured to generate a container including a container payload and a container header, the container payload including the packet generated by each of the multiple encapsulators, and
a multiplexer configured such that, under control of the scheduler, the multiplexer generates the link frame by selecting, one by one, a plurality of the containers generated by the multiple container makers.

16. The communication apparatus according to claim 15, wherein the number of the multiple container makers is equal to the number of the TDD time slots in each period.

17. The communication apparatus according to claim 1, further comprising:
multiple encapsulators each provided corresponding to the multiple applications and configured to generate a packet including a corresponding serial signal generated by the corresponding application, the encapsulators further outputting a ready signal indicating whether or not the packet is generated;
a packet selector configured to control the priority of the at least one specific TDD time slot and to select the packet to be transmitted in the at least one specific TDD time slot from among at least two of the packets generated by at least two of the encapsulators, on a basis of at least two of the ready signals generated by at least two of the encapsulators corresponding to the limited portion of the applications; and
wherein the frame constructor is configured to generate a link frame to be transmitted to the communication partner apparatus in each period, on a basis of the packet selected by the packet selector and the packet corresponding to any of the multiple applications excluding the limited portion thereof, and wherein the frame constructor includes a scheduler configured to control the packets to be transmitted in the multiple TDD time slots in each period.

18. The communication apparatus according to claim 17, wherein
the frame constructor includes
multiple container makers each configured to generate a container including a container payload and a container header, the container payload including the packet selected by the packet selector and the packet corresponding to any of the multiple applications excluding the limited portion thereof, the container header corresponding to the container payload, and
a multiplexer configured such that, under control of the scheduler, the multiplexer generates the link frame by selecting, one by one, a plurality of the containers generated by the multiple container makers.

19. The communication apparatus according to claim 18, wherein the number of the container makers is smaller than the number of the TDD time slots in each period.

20. A communication system comprising:
a first communication apparatus and a second communication apparatus each transmitting and receiving a packet in a TDD (Time Division Duplex) mode under a predetermined communication protocol, wherein
the first communication apparatus includes
a frame constructor configured to count an interval allocated in the TDD (Time Division Duplex) mode as one TDD time slot of a plurality of time slots, with the plurality of TDD time slots being counted as one period,
a transmitter configured to transmit periodically, to a communication partner apparatus, multiple application packets corresponding to serial signals generated by multiple applications, and
a control unit configured to provide, from among the multiple TDD time slots, at least one specific TDD time slot for transmitting a limited portion of the application packets corresponding to at least two of the multiple applications,
wherein the frame constructor is configured for shifting, in each period, priorities of the limited portion of the application packets to be transmitted in the at least one specific TDD time slot, and the second communication apparatus includes
a transmitter/receiver configured to receive the packets transmitted from the first communication apparatus and, in each period including the multiple TDD time slots, transmit periodically the packets to the first communication apparatus.

21. A communication method for a communication apparatus, the method comprising:
counting an interval allocated in a TDD (Time Division Duplex) mode as one TDD time slot of a plurality of TDD time slots, with the plurality of TDD time slots being counted as one period, while transmitting periodically, to a communication partner apparatus, multiple application packets corresponding to serial signals generated by multiple applications; and providing, from among the plurality of TDD time slots, at least one specific TDD time slot for transmitting a limited portion of the application packets corresponding to at least two of the multiple applications, while shifting, in each period, priorities of the limited portion of the application packets to be transmitted in the at least one specific TDD time slot.

* * * * *